United States Patent [19]
Nagato

[11] Patent Number: 5,293,420
[45] Date of Patent: Mar. 8, 1994

[54] RING TRIP CIRCUIT

[75] Inventor: Takashi Nagato, Kawasaki, Japan

[73] Assignee: Fujitsu Limited, Kawasaki, Japan

[21] Appl. No.: 34,499

[22] Filed: Mar. 19, 1993

[30] Foreign Application Priority Data

Mar. 19, 1992 [JP] Japan .................. 4-063917

[51] Int. Cl.⁵ .............................................. H04M 3/00
[52] U.S. Cl. ................... 379/382; 379/252; 379/253; 379/255; 379/254
[58] Field of Search ............... 379/382, 386, 252, 253, 379/254, 255, 377

[56] References Cited
FOREIGN PATENT DOCUMENTS

| 54-112109 | 1/1979 | Japan. |
| 56-073957 | 6/1981 | Japan. |
| 56-087971 | 7/1981 | Japan. |
| 61-220553 | 9/1986 | Japan. |
| 0300657 | 12/1988 | Japan .................. 379/382 |

Primary Examiner—James L. Dwyer

[57] ABSTRACT

A first part for picking up a signal being proportional to a ringing tone signal transferred on a subscriber line; a second part for extracting an ac component from the thus picked-up signal; and a third part for receiving both the signals from the first and second parts and comparing, in level, these two signals to produce a ringer stop signal if the level difference therebetween becomes larger than a setpoint value, and thus, a conventional low-pass filter can be removed.

10 Claims, 8 Drawing Sheets

ON-HOOK STATE

OFF-HOOK STATE

RING TRIP CIRCUIT

BACKGROUND OF THE INVENTION

1. Field of the Invention

The present invention relates to a ring trip circuit.

A ring trip circuit is employed as, for example, a part of each subscriber line circuit in a telephone exchange system. When a subscriber is called up by ringing the bell of his telephone set, the ring trip circuit functions, if the subscriber removes the handset from the telephone set, i.e., the telephone is put in an off-hook state, to stop the ringing immediately after the detection of the off-hook state.

2. Description of the Related Art

The prior art ring trip circuit has as one of its essential elements a low-pass filter which cancels an ac component of the ringing tone signal and extracts only a dc component therefrom. However, the use of the low-pass filter produces a major problem that it takes a long time to finally detect a level change of the dc component, this level change occurring in response to a change in state to the off-hook state. This long response time is caused by a first-order response lag inherent to the low-pass filter and usually becomes as long as, e.g., 350 ms. This being so, a ringer stop signal cannot be output until 350 ms lapses after the status change to the off-hook state. Therefore, during the lapse of 350 ms, the called party must unwillingly hear the ringing tone signal from the handset, the sound of this ringing tone signal being generally uncomfortable.

Another problem is that the low-pass filter inevitably requires an amplifier to revive a dc level which has been suppressed together with an ac component when the signal is processed in the low-pass filter.

SUMMARY OF THE INVENTION

Therefore, the present invention has as its object the provision of a ring trip circuit which can be constructed without using a low-pass filter which necessarily produces the aforementioned problems.

To achieve the above-mentioned object, the ring trip circuit of the present invention is constructed such that a first signal is picked up, which signal is proportional to the ringing tone signal transferred on the subscriber line; a second signal is generated by extracting an ac component from the first signal; and the above first and second signals are compared to produce the ringer stop signal if the level difference between the first and second signals becomes larger than a setpoint value.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
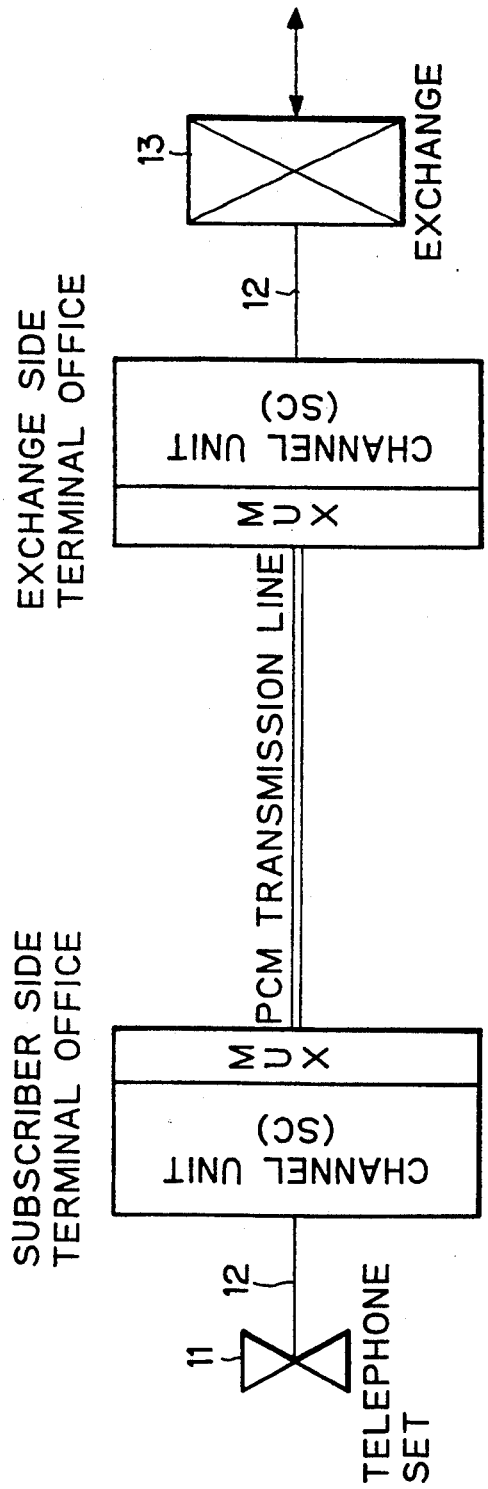
FIG. 1 illustrates an example of a part of a conventional telephone exchange system.

FIG. 1 illustrates an example of a part of a conventional telephone exchange system. In this figure, a plurality of telephone sets 11 are accommodated, via respective subscriber lines 12, in an exchange 13. Note that only one telephone set 11 is illustrated in FIG. 1 for brevity. In some case, a certain group of the telephone sets 11 is disposed far from the exchange 13. For this case, a multichannel path is introduced between the related remote subscribers (11) and the exchange 13 to sum together the subscriber lines thereof. The multichannel path is shown, in FIG. 1, by a subscriber side terminal office, a PCM transmission line and an exchange side terminal office. The subscriber side terminal office and the exchange side terminal office have a common structure which includes, as major parts, a channel unit (SC: Subscriber Channel) and a multiplex/demultiplex unit (MUX).

The ring trip circuit to which the present invention relates, is mounted in each of the channel units.

Figure 2:
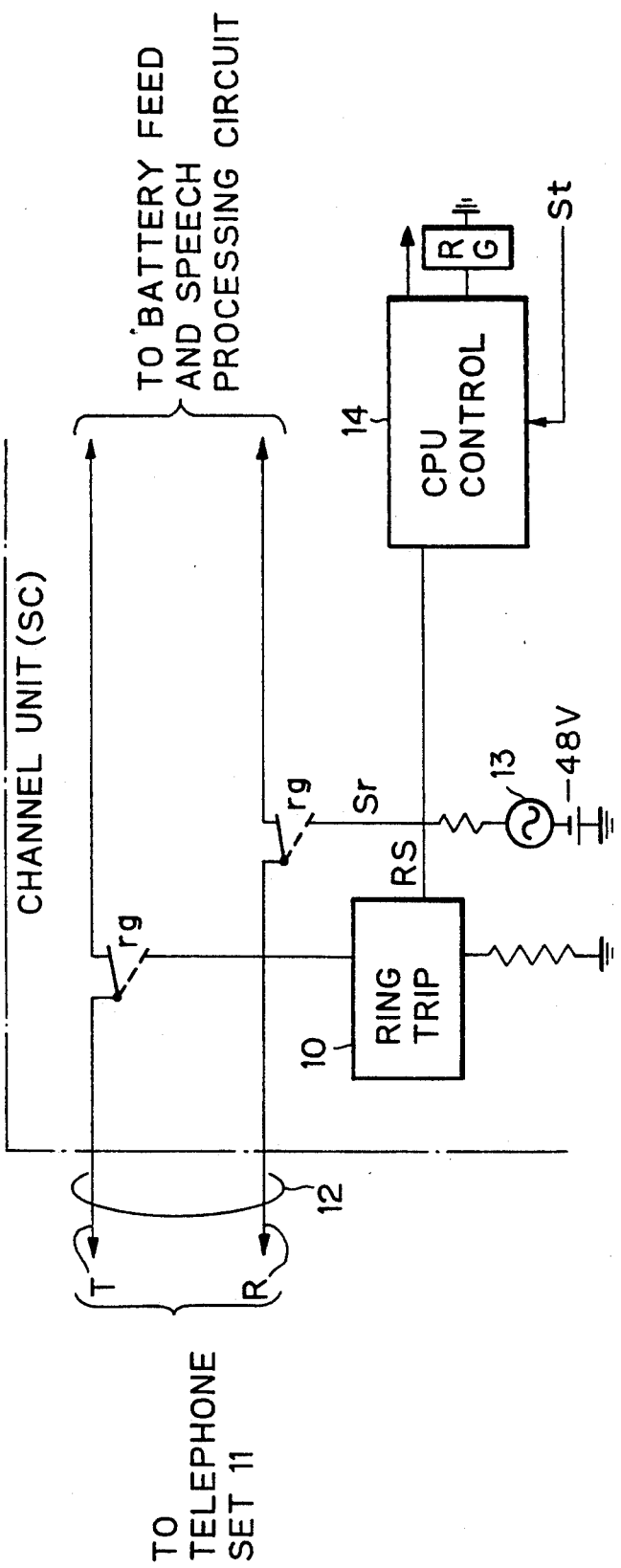
FIG. 2 is a view for clarifying a location of the ring trip circuit in a conventional telephone exchange apparatus.

FIG. 2 is a view for clarifying a location of the ring trip circuit in a conventional telephone exchange apparatus. In this figure, the ring trip circuit is located at a block represented by reference numeral 10. When one of the telephone sets 11 is to be called up from the multiplex/demultiplex (MUX) unit, a call terminating signal St is given. Upon receipt of the signal St, a CPU control unit 14 energizes a relay RG so that the relay contacts rg are changed over from contact positions shown by solid lines to contact positions shown by broken lines. Thus, a ringing tone signal Sr from a ringer oscillator 13 travels, via a ring line R of the subscriber line 12, to a bell circuit (not shown) inside the telephone set 11 and returns, via a tip line (T) and the ring trip circuit 10, to ground. The ringing tone signal activates the bell circuit to ring the bell, and thereby the subscriber is informed of a call arrival. In this state, a calling circuit is formed inside the telephone set 11, where only signal, can pass through the calling circuit.

In response to the ringing of the bell, the subscriber (11) removes the handset from the telephone set 11 to enter into the off-hook state. In the off-hook state, the circuit formed in the telephone set is switched from the aforesaid calling circuit to a speech circuit. The speech circuit is equivalent to a pure resistance circuit of, e.g., 600 $\Omega$. Thereafter, a dc voltage from a voltage source of $-48$ V is superposed on the subscriber line 12 in addition to the ringing tone signal. Thus, a level change of dc voltage takes place on the subscriber line 12 due to a status change to the off-hook state.

The ring trip circuit 10 detects the aforesaid level change of the dc voltage and produces, at the occurrence of the level change, the ringer stop signal RS. The signal RS is applied to the CPU control unit 14. Then the unit 14 deenergizes the relay RG and, at the same time, informs the detection of the off-hook state to the multiplex/demultiplex unit (MUX). Soon after this, the called party and the other party can enter into a speech state.

Figure 3:
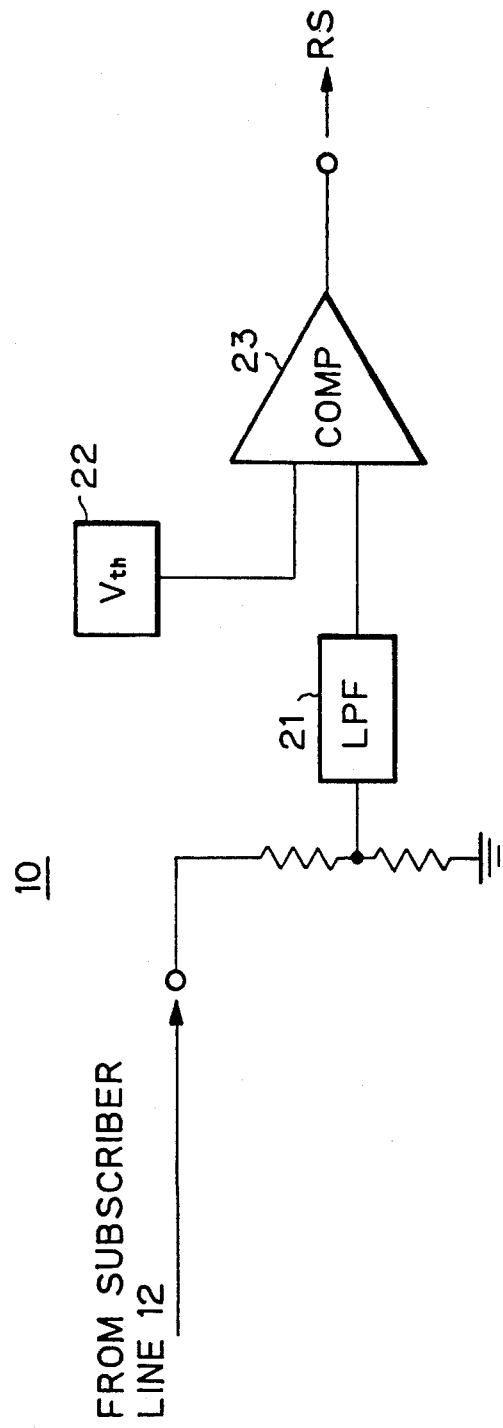
FIG. 3 illustrates a principle construction of a conventional ring trip circuit.

FIG. 3 illustrates a principle construction of a conventional ring trip circuit. As mentioned before, a level change of dc voltage occurs on the subscriber line 12 due to the aforesaid off-hook state and, after the detection of the dc level change, the ringer stop signal RS is issued. For this, first, from the signal which is composed of a dc voltage and an ac component (ringing tone signal) superposed on the dc voltage and transferred on the subscriber line 12, the ac component signal is removed by a low-pass filter (LPF) 21, since the ac component signal has nothing to do with the detection of the aforesaid dc level change, and thereby only the dc component signal is applied to a comparator 23 at its first comparing input. On the other hand, a dc threshold voltage Vth is given from a reference voltage source 22 to the second comparing input of the comparator 23. If dc level at the first comparing input becomes lower than the dc level (Vth) at the second comparing input, it is detected that the off-hook state has occurred, so that the ringer stop signal RS is issued.

Figure 4:
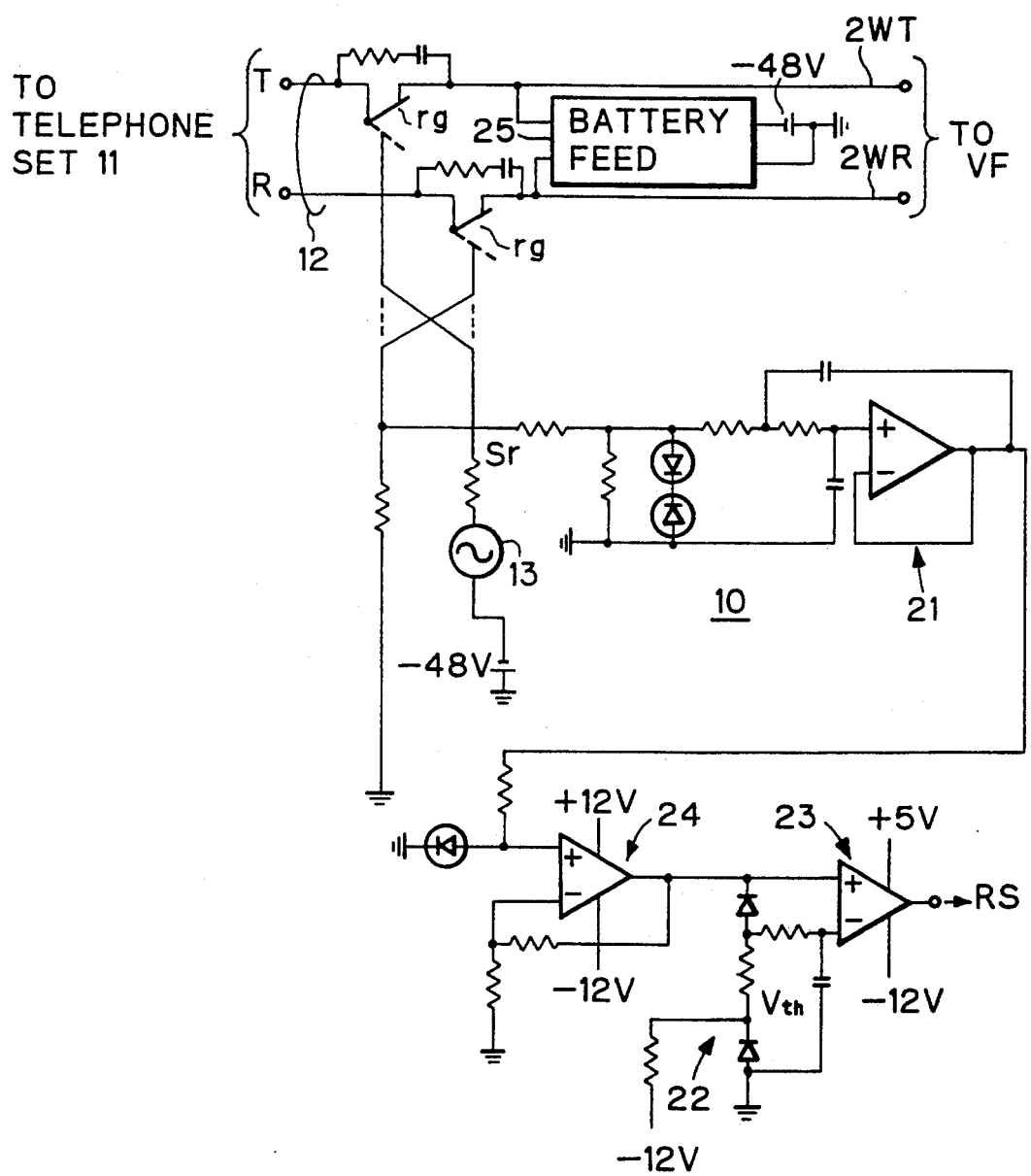
FIG. 4 illustrates a detailed example of the ring trip circuit shown in FIG. 3.

FIG. 4 illustrates a detailed example of the ring trip circuit shown in FIG. 3. In this figure, the aforesaid low-pass filter (LPF) is shown at the portion represented by reference numeral 21, which is realized as, e.g., a second order low-pass filter. The dc component signal output from the low-pass filter 21 is applied, after dc amplification in an amplifier 24, to a comparator 23 which consists of an operational amplifier. The comparator 23 compares the level of the thus applied dc component signal with the dc threshold level Vth given from the reference voltage source 22.

Incidentally, in FIG. 4, reference numeral 25 denotes a battery feed circuit for working the telephone set 11, and VF denotes a voice frequency speech processing circuit which follows at the next stage.

As explained above, in the conventional ring trip circuit, the low-pass filter 21 is one of the essential elements therefor so as to remove the ac component signal (Sr) of 10 Hz or more from the signal applied since the ac component signal is not necessary for achieving the dc level comparison at the comparator 23.

However, as mentioned earlier, the first-order response lag in the low-pass filter 23 becomes large since the filter 23 must be able to handle a signal of 10 Hz or more. Therefore, the time required for detecting the aforesaid dc level change becomes as long as 350 ms. Thus, during the lapse of 350 ms, an uncomfortable ringing tone signal sounds in the called party's ear.

Further, as mentioned earlier, the prior art ring trip circuit requires the amplifier 24 to revive the dc level signal which has been attenuated during the filtering operation in the filter 21.

Figure 5:
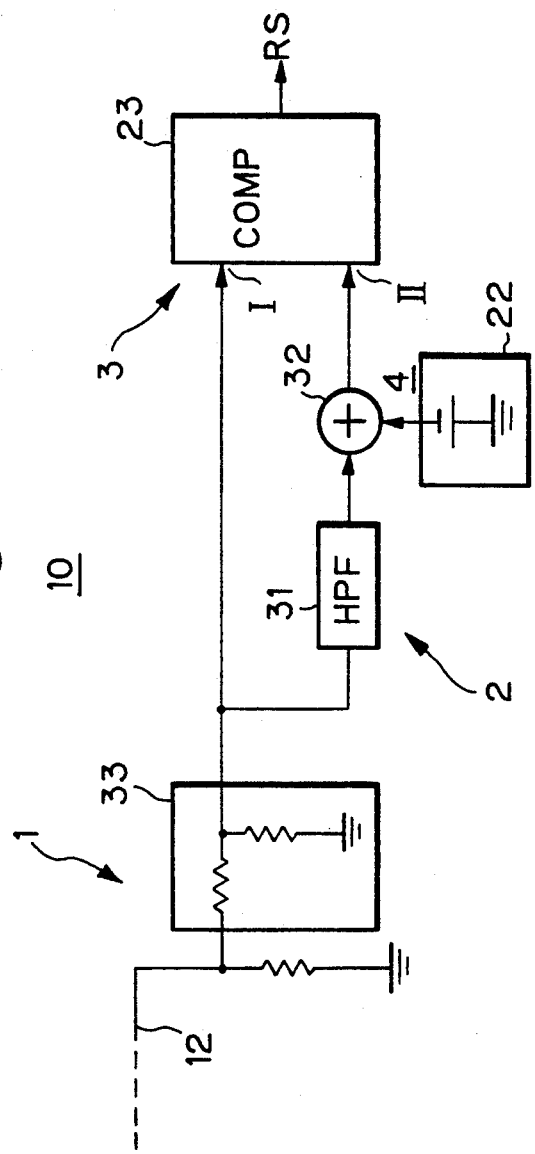
FIG. 5 illustrates a principle construction of a ring trip circuit according to the present invention.

FIG. 5 illustrates a principle construction of a ring trip circuit according to the present invention. Generally speaking, the ring trip circuit 10 according to the present invention is comprised of a first means 1 for picking up a signal that is proportional to a ringing tone signal transferred on a subscriber line 12;

a second means 2 for extracting an ac component from the thus picked up signal; and a third means 3 for receiving both the signals from first and second means 1, 2 and comparing, in level, these two signals to produce a ringer stop signal RS if the level difference therebetween becomes larger than a setpoint value.

The third means 1 is comprised of the comparator (COMP) 23 which receives, at its first input I, the picked-up signal and, at this second input II, the ac component signal.

The second means 2 is comprised of a high-pass filter (HPF) 31 allowing the ac component signal to pass therethrough.

The ac component signal is applied to the second input II of the comparator 23 by way of a biasing unit 4 to superpose a voltage level onto the ac component signal, the voltage level corresponding to the aforesaid setpoint value.

The biasing unit 4 consists of an adder 32 and the dc voltage source 22. The adder 32 is operative to add the output from the high-pass filter 31 and the output from the dc voltage source 22 which generates a dc voltage corresponding to the aforesaid setpoint value.

The first means 1 includes a voltage divider 33 to obtain the picked-up signal, and the signal is applied, on one hand, to the first input I of the comparator 23, and on the other hand, to the input of the high-pass filter 31.

The voltage divider 33 can be fabricated by a combination of resistors as shown in FIG. 5. Thus, a signal proportional to the ringing tone signal returned from the telephone set 11 can be obtained.

The output from the voltage divider 33 is applied, on one hand, to the high-pass filter 31 through which only the ac component signal is allowed to pass.

The output from the high-pass filter 31 is added, at the adder 32, to the dc voltage which corresponds to the aforesaid dc threshold voltage Vth shown in FIG. 3.

A principle operation of the circuit shown in FIG. 5 will be explained below.

In the prior art, it has been a basic concept that an ac component which is not necessary to achieve a detection of a dc level change, must be forcibly eliminated. According to the present invention, however, a basic concept is adopted in that the ac component can substantially be removed as follows. As known, the signal to be compared, i.e., the signal on the subscriber line 12, is inevitably accompanied by an ac component. This being so, if the other signal to be compared, i.e., the threshold signal (Vth) is accompanied by an ac component identical to the above ac component, the above two signals are cancelled in terms of the respective ac components when the comparison between the two signals is carried out.

As a result, the low-pass filter of the prior art ring trip circuit can be eliminated from the ring trip circuit of the present invention.

Figure 6:
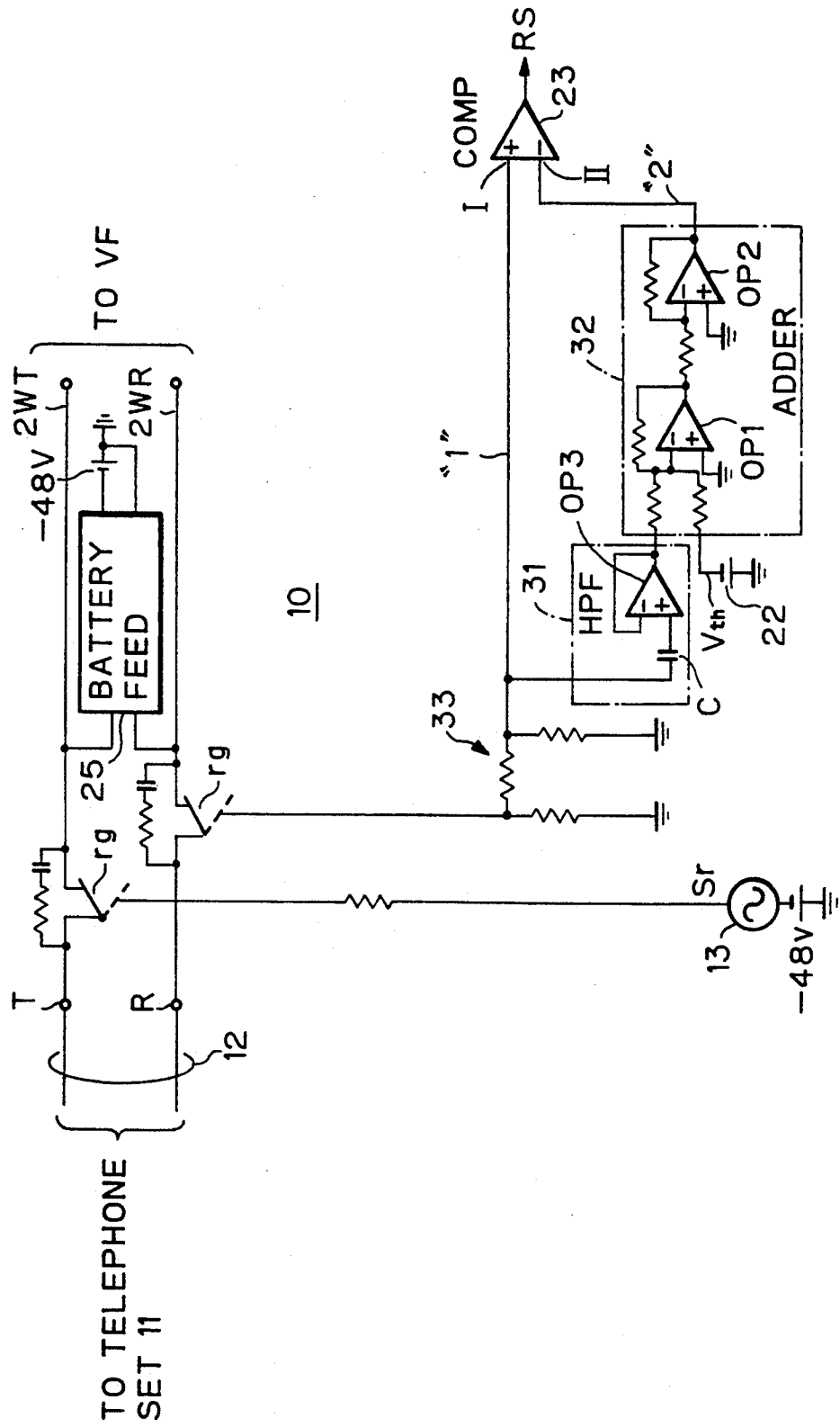
FIG. 6 is a circuit diagram of a first embodiment according to the present invention.

FIG. 6 is a circuit diagram of a first embodiment according to the present invention. This figure corresponds to the aforementioned FIG. 4 showing the prior art. A major difference between the constructions of FIGS. 4 and 6 is the removal of the low-pass filter 21 (FIG. 4) from the circuit of FIG. 6. And, in place of the removed low-pass filter 21, the high-pass filter (HPF) 31 is newly introduced in the circuit (FIG. 6) of the present invention. It should be noted here that the high-pass filter can, in general, provide a quick response, and therefore, the problem of a time lag in the detection of the aforesaid dc level change, can be overcome.

The high-pass filter 31 consists of a capacitor C which receives the aforesaid picked-up signal, and amplifier OP3 which has an input impedance high enough to transmit the capacitor output with fidelity.

The adder 32 consists of a first stage operational amplifier OP1 and a second stage operational amplifier OP2. The first stage operational amplifier OP1 receives the output from the high-pass filter together with the output from the dc voltage source 22, while the second stage operational amplifier OP2 is operative to supply an inverted output of the first stage operational amplifier OP1 to the second input II of the comparator 23.

That is, the output voltage of the high-pass filter 31 is added to the threshold voltage Vth at the first stage operational amplifier OP1 to obtain resultant addition output therefrom. Since the first stage operational amplifier OP1 receives both the high-pass filtered output as well as the voltage Vth at its inverting input (−), the resultant addition output is recovered in polarity by the second stage operational amplifier OP2.

Figure 7A:
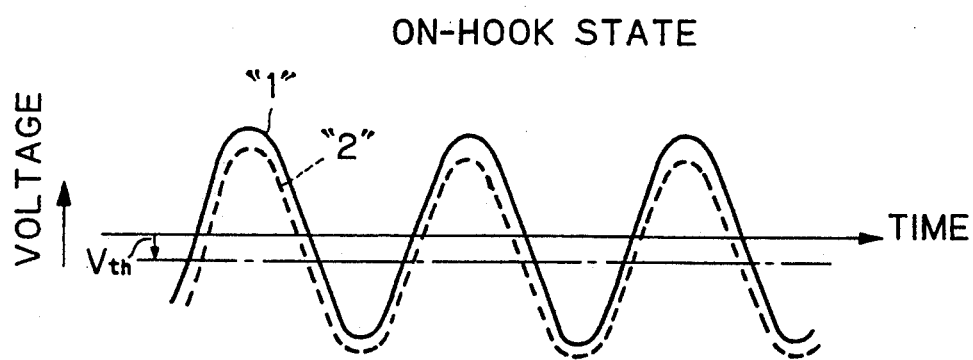
FIGS. 7A and 7B depict waveforms of signals appearing at major portions in FIG. 6.
Figure 7B:
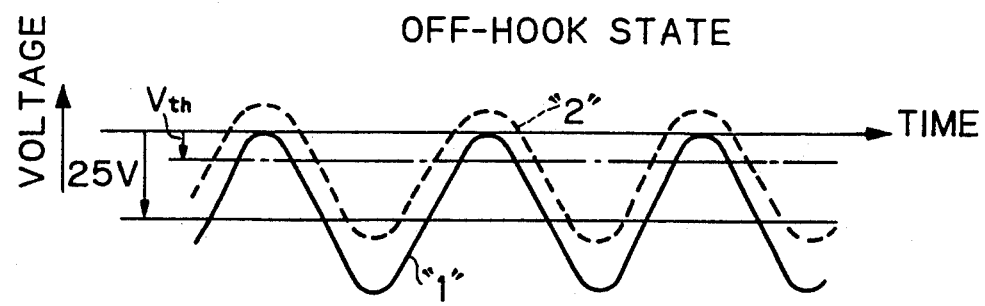

FIGS. 7A and 7B depict waveforms of signals appearing at major portions in FIG. 6. The waveforms of FIG. 7A appear during the on-hook state, while the waveforms of FIG. 7B appear during the off-hook state. In these figures, the solid line curve "1" corresponds to the signal appearing at the portion "1" in FIG. 6 (also in FIG. 8), and the broken line curve "2" corresponds to the signal appearing at the portion "2" in FIG. 6 (also in FIG. 8). Namely, the waveform "1" represents the signal voltage on the subscriber line 12 obtained through the voltage divider 33, and the waveform "2" represents the signal voltage which is obtained by extracting only the ac component from the output of the voltage divider 33 and being further added to the bias voltage (Vth).

Now suppose that a subscriber is called up but the handset still remains as it is, i.e., in the on-hook state (FIG. 7A), the waveform "1" indicates the ac component signal on which the dc voltage is not yet superposed. While, in this case, the waveform "2" indicates a signal from which the dc component is cut off by the high-pass filter 31, which signal is further shifted by the voltage Vth relative to the signal of the waveform "1". Accordingly, the level of the waveform "1" is higher than the level of the waveform "2", as a whole. Thereby, the comparator 23 does not produce the ringer stop signal RS.

Thereafter, suppose that the called subscriber removes the handset, i.e., initiating the off-hook state (FIG. 7B), the level of the waveform "1" is shifted downward, since the signal on the subscriber line 12 is pulled downward, as a whole, by a power source of −48V immediately after the status change to the off-hook state. The downward voltage shift occurs with, e.g., −25V. While, in this case, the signal directed to the second input II of the comparator 23 is applied to the high-pass filter 31 to remove the dc component therefrom and further is added to the voltage Vth, consequently, the waveform of the signal becomes as shown by "2" in FIG. 7B. Generally, during the off-hook state, the amplitude of the signal "2" (FIG. 7B) becomes smaller than that of the signal "2" (FIG. 7A). This is because, during the off-hook state, the signal on the subscriber line 12 is obtained through the aforesaid speech circuit inside the telephone set, the speech circuit being equivalent to a pure resistance circuit of, e.g., 600 Ω, as mentioned earlier. In such an off-hook state as shown in FIG. 7B, the level of the signal "1" is shifted lower than the level of the signal "2", as a whole. Accordingly, a level inversion appears at the input side of the comparator 23, and therefore, the ringer stop signal RS is issued therefrom.

As understood from the above, according to the present invention, the dc level change can be detected by the comparator while leaving the ac component as it is. This enables an elimination of the conventional low-pass filter from the ring trip circuit 10. Accordingly, the aforesaid problems due to the presence of the conventional low-pass filter can be overcome.

Referring back to FIG. 6, the ring trip circuit 10 according to the first embodiment is constructed such that the ground of the dc threshold voltage source 22 for producing the dc level corresponding to the threshold Vth is common to the ground of the voltage divider 31, whereby the ring trip circuit 10 is formed as a type of so-called grounded detector. In such a grounded detection type ring trip circuit, the operations for the detection can be carried out on the basis of the same ground. This enables a simplification of circuit construction.

Figure 8:
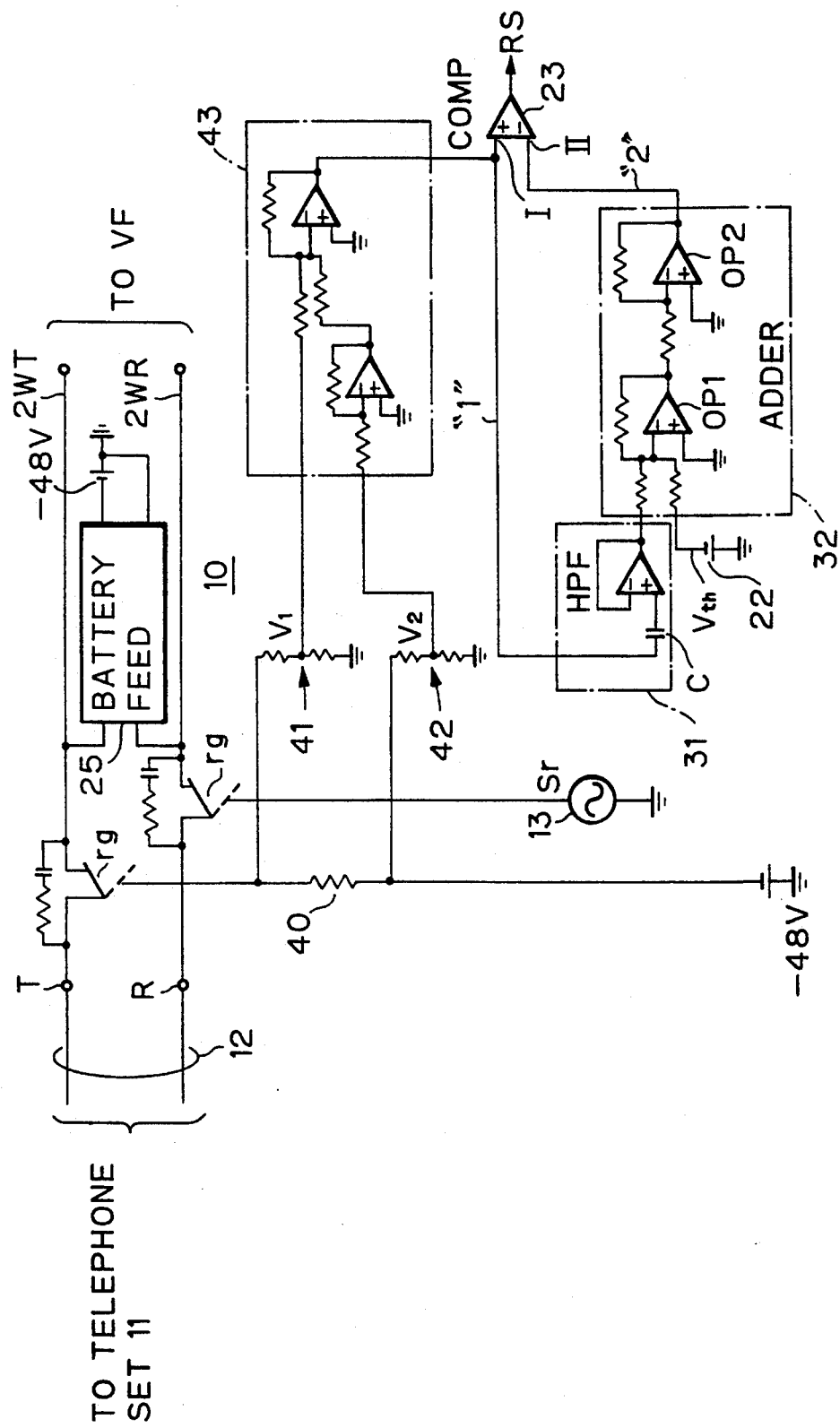
FIG. 8 is a circuit diagram of a second embodiment according to the present invention.

FIG. 8 is a circuit diagram of a second embodiment according to the present invention. The second embodiment is advantageous if used in the following case. The above-mentioned grounded detection type ring trip circuit, as in the first embodiment, cannot always be adopted. For example, if the ring trip circuit is mounted in a user's private exchange, the user often requests to utilize an existing ringer oscillator for the newly introduced ring trip circuit, the ringer oscillator having been used for the formed ring trip circuit. In such a case, however, the ringer oscillator is usually grounded directly as shown in FIG. 8. This being so, the power source of −48V must be grounded separately from the ground of the existing ringer oscillator 13 as shown in FIG. 8. In other words, in a case where the ringer oscillator is provided by the user, the ringer oscillator is disposed, referring to FIG. 6, at the voltage divider (33) side ground. This being so, it becomes impossible to adopt the aforesaid grounded detection type ring trip circuit.

To cope with this, a construction of a so-called balanced detection type (FIG. 8) can be employed. Generally speaking, the first means 1 is comprised of a detection resistor 40 for detecting a voltage change of the ringing tone signal, a first voltage transformed 41 for transforming a voltage appearing at one end of the detection resistor 40 to become one potential relative to ground, a second voltage transformed 42 for transforming a voltage appearing at other end of the detection resistor to become other potential relative to the same ground, the voltage detector 43 for producing the voltage difference between the thus transformed two signals ($V_1$, $V_2$) and applying the resultant voltage difference, on one hand, to the first input I of the comparator 43 and, on the other hand, to the input of the high-pass filter 31.

Preferably, the first voltage transformer 41 consists of first voltage dividing resistors connected, at its one end, to ground and the second voltage transformed 42 consists of second voltage dividing resistors connected, at its one end, to the same ground.

To be specific, the detection resistor 40 is connected in series between the power source of −48V and the ring line (R) of the subscriber line 12. The voltages appearing at both ends of the detection resistors are grounded through the first and second voltage dividing resistors (41, 42), respectively. Whereby, each voltage at both ends can be converted to a form of an electric current. The electric currents from both ends induce voltage drops across the first and second voltage dividing resistor (41, 42). It should be noted here that the thus obtained voltages $V_1$ and $V_2$ are the potentials on the basis of the same ground.

The voltage difference between the voltages $V_1$ and $V_2$ is indicative of the voltage change in the subscriber line 12, which voltage change is measured through the voltage detection resistor 40. This voltage change is similar to the voltage change appearing, in FIG. 6, at the output of the voltage divider 33. Therefore, subsequent operations carried out in the ring trip circuit of FIG. 8 are identical to those carried out in the aforementioned ring trip circuit of FIG. 6.

As explained above, the ring trip circuit according to the present invention can remove the conventional low-pass filter from the ring trip circuit and this enables a minimization of a time lag in the detection of the off-hook state. Further, the high-pass filter replacing the conventional low-pass filter is usually very small in size and this enables a minimization of the ring trip circuit.

I claim:

1. A ring trip circuit comprising:
   a first means for picking up a signal that is proportional to a ringing tone signal transferred on a subscriber line;
   a second means for extracting an ac component from the thus picked-up signal; and
   a third means for receiving both the signals from said first and second means and comparing, in level, these two signals to produce a ringer stop signal if the level difference therebetween becomes larger than a setpoint value.

2. A ring trip circuit as set forth in claim 1, wherein said third means is comprised of a comparator receiving, at its first input, said picked-up signal and, at its second input, said ac component signal.

3. A ring trip circuit as set forth in claim 2, wherein said second means is comprised of a high-pass filter allowing said ac component signal to pass therethrough.

4. A ring trip circuit as set forth in claim 3, wherein said ac component signal is applied to the second input of said comparator by way of a biasing unit to superpose a voltage level onto said ac component signal, which voltage level corresponds to said setpoint value.

5. A ring trip circuit as set forth in claim 4, wherein said biasing unit consists of an adder and a dc voltage source, which adder is operative to add the output from said high-pass filter and the output from said dc voltage source which generates a dc voltage corresponding to said setpoint value.

6. A ring trip circuit as set forth in claim 3, wherein said first means includes a voltage divider to obtain said picked-up signal, which signal is applied, on one hand, to the first input of said comparator and on the other hand, to the input of said high-pass filter.

7. A ring trip circuit as set forth in claim 3, wherein said high-pass filter consists of a capacitor receiving said picked-up signal and an amplifier having an input impedance high enough to transmit the capacitor output with fidelity.

8. A ring trip circuit as set forth in claim 5, wherein said adder consists of a first operational amplifier and a second operational amplifier, which first operational amplifier receives the output from said high-pass filter together with the output from said dc voltage source, while said second operational amplifier is operative to supply an inverted output of the first operational amplifier to the second input of said comparator.

9. A ring trip circuit as set forth in claim 5, wherein said first means is comprised of a detection resistor for detecting a voltage change of the ringing tone signal, a first voltage transformer for transforming a voltage appearing at one of said detection resistor to become one potential relative to ground, a second voltage transformer for transforming a voltage appearing at the other end of said detection resistor to become another potential relative to the same ground, and a voltage detector for producing the voltage difference between the thus transformed two signals and applying the resultant voltage difference, on one hand, to the first input of said comparator and, on the other had, to the input of said high-pass filter.

10. A ring trip circuit as set forth in claim 9, wherein said first voltage transformer consists of first voltage dividing resistors connected, at its one end, to said ground and said second voltage transformer consists of second voltage dividing resistors connected, at its one end, to the same ground.

* * * * *